United States Patent [19]
Auner et al.

[11] Patent Number: 5,861,469
[45] Date of Patent: Jan. 19, 1999

[54] PHOTOLUMINESCENT BICYCLIC POLYDISLACYCLOBUTANES

[75] Inventors: Norbert Auner, Berlin, Germany; Udo C. Pernisz, Midland, Mich.

[73] Assignee: Dow Corning Corporation, Midland, Mich.

[21] Appl. No.: 877,787

[22] Filed: Jun. 17, 1997

[51] Int. Cl.[6] .................................................. C08G 77/04
[52] U.S. Cl. ........................... 528/32; 526/279; 556/431
[58] Field of Search .............................. 556/431; 528/32, 528/35; 526/279

[56] References Cited

U.S. PATENT DOCUMENTS 5,777,051  7/1998  Auner et al. ............................... 528/32

OTHER PUBLICATIONS

Journal of Organometallic Chemistry, vol. 336, pp. 59–81, (1987).
Z. anorg. allg. Chem., vol. 558, pp. 55–86, (1988).
Z. anorg. allg. Chem., vol. 558, pp. 87–106, (1988).
Journal of Organometallic Chemistry, vol. 363, pp. 7–23, (1989).
Journal of Organometallic Chemistry, vol. 393, pp. 33–56, (1990).
Angew. Chem. Int. Ed. Engl., vol. 30, No. 9, pp. 1151–1152, (1991).
Journal of the American Chemical Society, vol. 114, pp. 4910–4911, (1992).
Chem. Ber., vol. 126, pp. 575–580, (1993).
Chem. Ber., vol. 126, pp. 2177–2186, (1993).
J. prakt. Chem., vol. 337, pp. 79–92, (1995).
Journal of Organometallic Chemistry, vol 377, pp. 175–195, (1989).
Chem. Eur. J., vol. 3, No. 6, pp. 948–957, (Jun. 1997).

*Primary Examiner*—Melvyn I. Marquis
*Attorney, Agent, or Firm*—James L. DeCesare

[57] ABSTRACT

Photoluminescent bicyclic polydisilacyclobutanes are made by reacting a dialkenyldihalocarbosilane with an organolithium reagent in the presence of a solvent at 0°–25° C.

4 Claims, No Drawings

PHOTOLUMINESCENT BICYCLIC POLYDISILACYCLOBUTANES

CROSS-REFERENCE TO RELATED APPLICATIONS

This application is related to prior copending application U.S. Ser. No. 08/867,147, filed on Jun. 2, 1997, entitled "Photoluminescent Polydisilacyclobutanes", which application is assigned to the assignee of this present application.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

This invention is directed to polycarbosilanes, and to polymers in which silicon atoms are linked through substituted alkylene bridges. The substituted polysilalkylenes are bicyclic polydisilacyclobutanes.

The literature makes reference to processes using halosilanes containing a single unsaturated linkage. See for example, Z. Anorg. Allg. Chem., Volume 558, Pages 55–86, (1988); Chem. Ber., Volume 126, Pages 575–580, (1993); and J. Prakt. Chem., Volume 337, Pages 79–92, (1995).

By using halosilanes containing two unsaturated linkages, as exemplified in Journal of Organometallic Chemistry, Volume 377, Pages 175–195, (1989), we are enabled to produce higher molecular weight materials, i.e., polymers.

While one co-inventor herein has co-authored a recent article relative to certain silacyclobutanes, the article does not describe polymers which replicate the bicyclic polymer described herein. In particular, reference may be had to Chem. Eur. J., Volume 3, Number 6, Pages 948–957, (June 1997).

BRIEF SUMMARY OF THE INVENTION

This invention relates to methods of making photoluminescent bicyclic polydisilacyclobutanes, and to bicyclic polydisilacyclobutanes of the structure

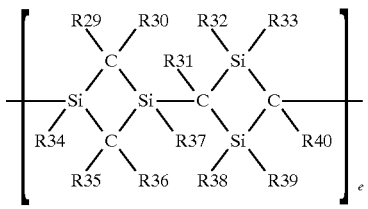

where e and R29 to R40 are defined below.

The bicyclic polydisilacyclobutanes are made by reacting an organolithium reagent with a monomer of the structure

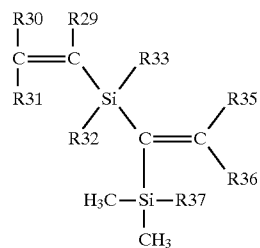

where R29 to R33, and R35-R37 are defined below. Such monomers can be made by methods generally described in Chem. Ber., Volume 126, Pages 575–580, (1993).

These and other features of our invention will become apparent from a consideration of the detailed description.

DETAILED DESCRIPTION OF THE INVENTION

This invention is directed to methods of preparing polymers having low to medium degrees of polymerization based on a disilacyclobutane building block. The basic reaction involves using a divinyldichlorocarbosilane and tert-butyllithium in order to obtain desired products.

Unexpectedly, we found that these polymers exhibit strong photoluminescence in the blue region of the visible spectrum when excited by ultraviolet (UV) light with a wavelength of 337 nanometer (nm).

A polymer representative of our invention is the bicyclic polydisilacyclobutane with a repeating unit

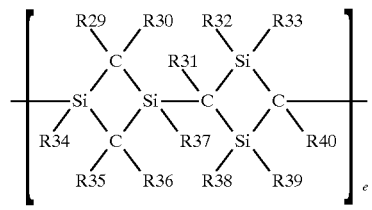

where e has a value of 2 to 20; R32 to R34, and R37 to R39 are halogen or an alkoxy radical; and R29 to R31, R35, R36, and R40 are hydrogen or an alkyl radical containing 2 to 10 carbon atoms. These are linear polymers terminated by suitable alkyl, aryl, or silyl groups.

One species (I) of this genus is shown below:

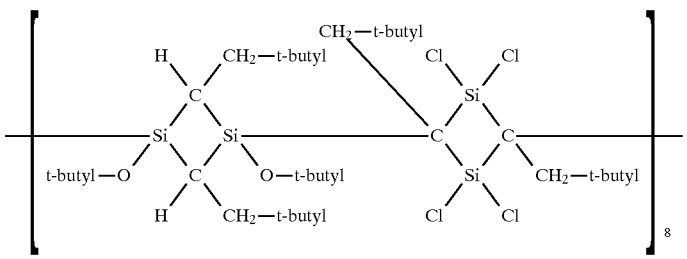

Particles of polymer (I) where chlorine groups were replaced by methoxy groups and where e=10, i.e., species (II), were irradiated with UV light at a wavelength of 337 nm generated by a pulsed nitrogen laser with 0.1 mJ per pulse. Photoluminescence was bright whiteish blue.

The process for making such polymers is illustrated below:

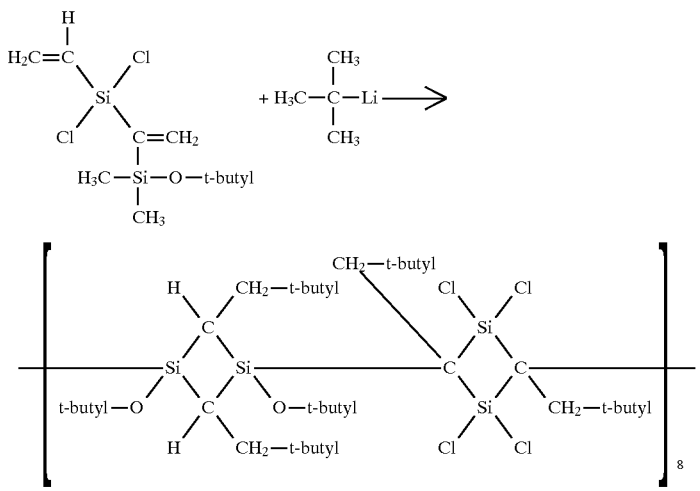

While tert-butyllithium is shown as the preferred organolithium reagent, other lithium alkyls or lithium aryls can be used, such as methyllithium, hexyllithium, or phenyllithium.

An example representing this process is set forth below in order to illustrate our invention in more detail.

EXAMPLE

Into a container were combined stoichiometric amounts of an unsaturated carbosilane of the structure

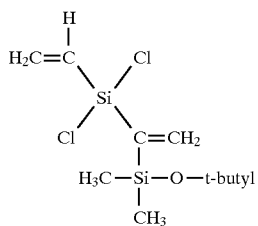

and tert-butyllithium, in pentane as solvent, at 0° C. The reactants were heated to room temperature, i.e., 20°–25° C. After removing the solvent, a yellow solid resulted. The yellow solid was identified as species (I) shown above, where e had a value of 10. For purification, a portion of the sample of species (I) was extracted with methanol. Hydrochloric acid was generated, and trapped by the addition of a small quantity of diethylamine. As a result, chlorine groups in species (I) were replaced by methoxy groups, yielding species (II), a white powder, where e also had a value of 10.

Isolation of photoluminescent bicyclic polydisilacyclobutanes can be carried out by extraction, crystallization, or precipitation by addition of alcohol.

Polymers prepared according to our invention are useful as passive or active display materials, and also in electroluminescent devices. In such utility, they can be incorporated into road signs and lane markers. The polymers also find application in various types of displays as luminescent coatings for improving their visibility.

Other variations may be made in polymers, compounds, compositions, and methods described herein without departing from the essential features of our invention. The forms of invention are exemplary only and not intended as limitations on their scope as defined in the appended claims.

We claim:

1. A photoluminescent bicyclic polydisilacyclobutane with a repeating unit of the formula

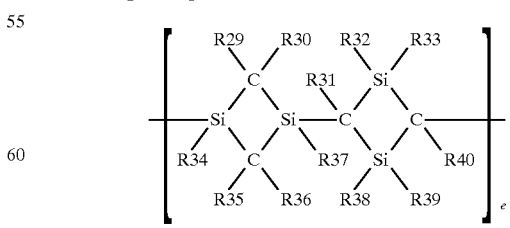

where e is an integer having a value of 2 to 20; R32 to R34, and R37 to R39 represent halogen or an alkoxy radical; and R29 to R31, R35, R36, and R40 represent hydrogen or an alkyl radical containing 2 to 10 carbon atoms.

2. Photoluminescent bicyclic polydisilacyclobutanes according to claim 1 exhibiting photoluminescence in the blue region of the visible spectrum when excited by ultraviolet light.

3. A carbosilane of formula

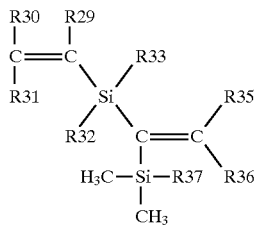

where R29, R30, R31, R35, and R36 represent hydrogen or an alkyl radical containing 2 to 10 carbon atoms; and R32, R33, and R37 represent halogen or an alkoxy radical.

4. A method of making photoluminescent bicyclic polydisilacyclobutanes comprising contacting an unsaturated carbosilane containing at least two silicon atoms with an organolithium reagent in a solvent at a temperature of 0°–25° C., the unsaturated carbosilane having the formula

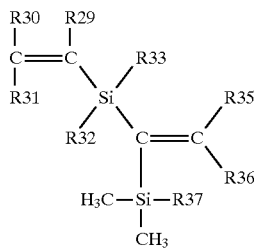

where R29, R30, R31, R35, and R36 represent hydrogen or an alkyl radical containing 2 to 10 carbon atoms; and R32, R33, and R37 represent halogen or an alkoxy radical.

* * * * *

UNITED STATES PATENT AND TRADEMARK OFFICE
CERTIFICATE OF CORRECTION

PATENT NO. : 5861469
DATED : January 19, 1999
INVENTOR(S) : Norbert Auner and Udo C. Pernisz It is certified that error appears in the above-identified patent and that said Letters Patent is hereby corrected as shown below:

On the title page, item [54] and Column 1, line 2:
"POLYDISLACYCLOBUTANES" should read --POLYDISILACYCLOBUTANES--.

Signed and Sealed this

Twenty-fifth Day of May, 1999

Attest:

Attesting Officer

Q. TODD DICKINSON

Acting Commissioner of Patents and Trademarks